US011681519B2

(12) United States Patent
Hegde et al.

(10) Patent No.: US 11,681,519 B2
(45) Date of Patent: Jun. 20, 2023

(54) SOFTWARE UPDATE ON A NETWORK DEVICE FORMING A MULTI-CHASSIS LINK AGGREGATION GROUP (MC-LAG)

(71) Applicant: HEWLETT PACKARD ENTERPRISE DEVELOPMENT LP, Houston, TX (US)

(72) Inventors: Mamata Hegde, Bangalore (IN); Venkatavaradhan Devarajan, Bangalore (IN); Jagmeet Singh Hanspal, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 334 days.

(21) Appl. No.: 17/034,651

(22) Filed: Sep. 28, 2020

(65) Prior Publication Data
US 2021/0109744 A1   Apr. 15, 2021

(30) Foreign Application Priority Data
Oct. 14, 2019   (IN) .............................. 201941041485

(51) Int. Cl.
*G06F 8/656* (2018.01)
*H04L 45/00* (2022.01)
*G06F 9/4401* (2018.01)
*G06F 16/23* (2019.01)
*G06F 16/22* (2019.01)

(52) U.S. Cl.
CPC ............ *G06F 8/656* (2018.02); *G06F 9/4416* (2013.01); *G06F 16/2282* (2019.01); *G06F 16/2379* (2019.01); *H04L 45/22* (2013.01)

(58) Field of Classification Search
None
See application file for complete search history.

(56) References Cited

U.S. PATENT DOCUMENTS 6,658,090 B1 * 12/2003 Harjunen ................ G06F 8/656
                                                   379/9.01
7,355,983 B2    4/2008 Scudder et al.
7,457,248 B1 * 11/2008 Ali ....................... H04L 43/0811
                                                    370/235

(Continued)

OTHER PUBLICATIONS

Juniper Networks, "MC-LAG Technical Overview," Jan. 28, 2018, https://www.juniper.net/documentation/en_US/release-independent/nce/topics/concept/mc-lag-on-core-understanding.html.

*Primary Examiner* — Qing Chen
(74) *Attorney, Agent, or Firm* — Hewlett Packard Enterprise Patent Department (57) ABSTRACT

Examples disclosed herein relate to performing a software update on a network device forming a MC-LAG. In an example, a software update onto a first network device and a second network device may be downloaded. The first network device and the second network device may form a MC-LAG that may provide a redundant connectivity to a network device in a network. A shutdown of routing protocols on the first network device may be performed. Each of the routing protocols may advertise a maximum metric on the first network device, leading to a recalculation of network routes by the network device. The first network device may be updated with the software update. Until the software update on the first network device is complete, network traffic on the network may be routed through the second network device.

20 Claims, 5 Drawing Sheets

(56) References Cited

U.S. PATENT DOCUMENTS

| | | | |
|---|---|---|---|
| 8,943,490 B1 | 1/2015 | Jain et al. | |
| 2005/0177634 A1* | 8/2005 | Scudder | H04L 45/22 |
| | | | 709/225 |
| 2010/0002577 A1 | 1/2010 | Moreno et al. | |
| 2010/0306283 A1* | 12/2010 | Johnson | G06F 16/125 |
| | | | 707/821 |
| 2011/0231833 A1 | 9/2011 | Narayanan et al. | |
| 2014/0307540 A1* | 10/2014 | Duda | H04L 41/082 |
| | | | 370/220 |
| 2016/0313985 A1 | 10/2016 | Sprygada et al. | |
| 2016/0344617 A1* | 11/2016 | Gopalarathnam | H04L 45/22 |
| 2020/0287844 A1* | 9/2020 | Venkatakrishnan | H04L 49/25 |
| 2020/0310784 A1* | 10/2020 | Krishnan | H04L 69/164 |

* cited by examiner

SOFTWARE UPDATE ON A NETWORK DEVICE FORMING A MULTI-CHASSIS LINK AGGREGATION GROUP (MC-LAG)

BACKGROUND

Link aggregation, defined by the IEEE 802.1AX-2008 standard, is a method of grouping multiple Ethernet ports into a virtual link. The set of ports in a link aggregation group (LAG) are treated as a single port, such that a client may treat the Link Aggregation Group as if it were a single link. This increases bandwidth and provides redundancy.

BRIEF DESCRIPTION OF THE DRAWINGS

For a better understanding of the solution, examples will now be described, with reference to the accompanying drawings, in which.

DETAILED DESCRIPTION

Multi-Chassis Link Aggregation Group (MC-LAG) is a type of LAG with constituent ports that terminate on separate chassis, primarily for the purpose of providing redundancy in the event one of the chassis fails. MC-LAG adds node-level redundancy to the normal link-level redundancy that a LAG provides. This allows two or more nodes to share a common LAG endpoint. The multiple nodes present a single logical LAG to a remote end.

While MC-LAG provides chassis-level redundancy in regular operation, an upgrade still warrants some sort of maintenance window or a low user activity to reduce the perceived network disruption. However, due to the ongoing traffic, both peer nodes cannot be upgraded simultaneously as it would lead to complete traffic loss.

In a hypothetical scenario, a serial software update may be carried out on each of the nodes. However, this software upgrade process does not take care of traffic loss during failover. This is because when one of the nodes under goes a reboot, the control plane protocols such as Link Aggregation Control Protocol (LACP), Open Shortest Path First (OSPF), Border Gateway Protocol (BGP), and Virtual Router Redundancy Protocol (VRRP) may also shutdown, which may lead to some re-convergence time to re-establish network traffic via the peer node. Since the control plane protocols may take their own convergence time and to detect changes in topology, it may lead to an in-flight traffic loss for that delta duration depending on the control plane protocol.

To address these technical challenges, the present disclosure describes various examples for performing a software update on a network device forming a MC-LAG. In an example, a software update onto a first network device and a second network device may be downloaded. The first network device and the second network device may form a multi-chassis link aggregation group (MC-LAG) that may provide a redundant connectivity to a network device in a network. In an example, for performing a software update on the first network device, a graceful shutdown of routing protocols on the first network device may be performed. Each of the routing protocols may advertise a maximum metric on the first network device, leading to a recalculation of network routes by the network device. The first network device may then be updated with the software update. Until the software update on the first network device is complete, network traffic on the network may be routed through the second network device.

Examples disclosed herein describe a solution to gracefully switch network traffic handling to one of the peer MC-LAG nodes while the other is being upgraded. A graceful shutdown of control plane protocols is proposed before going for reboot. This gives an opportunity for the upstream/downstream network devices to find an alternative route to their destination.

Figure 1:
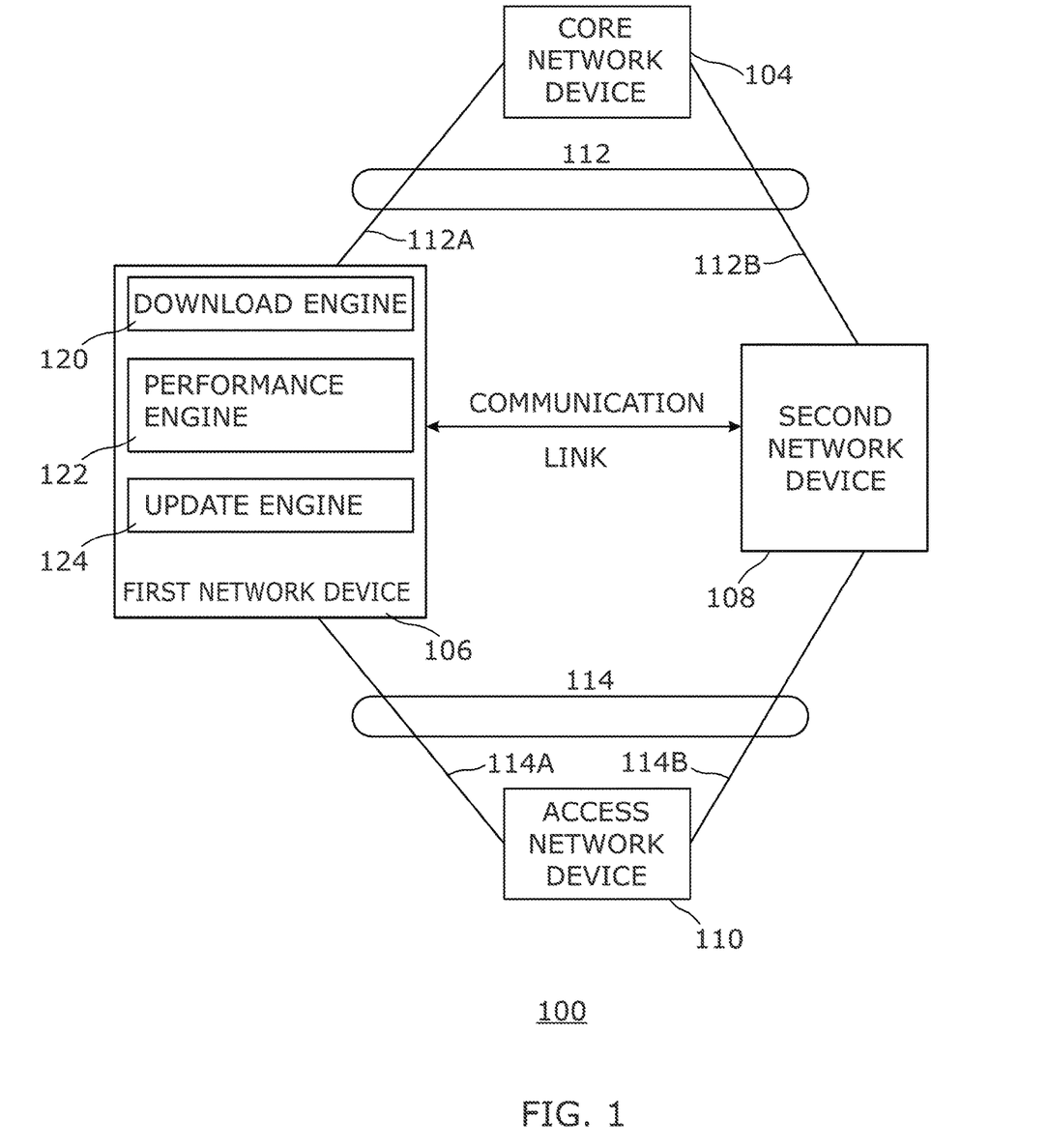
FIG. 1 is a block diagram of an example computing environment for performing a software update on a network device forming a Multi-Chassis Link Aggregation Group (MC-LAG)

FIG. 1 is a diagram of an example computing environment 100 for performing a software update on a network device forming a Multi-Chassis Link Aggregation Group (MC-LAG). Computing environment 100 may include a core network device 104, a first network device 106, a second network device 108, and an access network device 110. Although four network devices are shown in FIG. 1, other examples of this disclosure may include more than or less than four network devices.

Core network device 104, first network device 106, second network device 108 and access network device 110 may be communicatively coupled over a direct link or a computer network. The computer network may be a wireless or wired network. The computer network may include, for example, a Local Area Network (LAN), a Wireless Local Area Network (WAN), a Campus Area Network (CAN), or the like. Further, the computer network may be a public network (for example, the Internet) or a private network (for example, an intranet). In an example, the computer network may be an IP network. Core network device 104, first network device 106, second network device 108, and access network device 110 may each be, for example, a network router, a network switch, or an L3 network device with L2 functionality.

In an example, core network device 104 may be a part of a backbone area or core of a network. All other areas may be connected to it, either directly or through other routers. Inter-area routing may occur through routers connected to the backbone area and to their own associated areas. The backbone area is responsible for distributing routing information between non-backbone areas.

In an example, first network device 106, and second network device 108 may each be a provider edge (PE) router that may be located at an edge of a service provider network. First network device 106, and second network device 108 may interface with a customer edge (CE) router (not shown) that may be located at an edge of a customer network.

In an example, access network device 110 may include an access network switch. Access network device may be located at the access layer of the network for connecting end-user devices to the network. It may include high-density ports.

In an example, from a management or control plane perspective, first network device 106 and second network device 108 may be in an active-standby configuration. In an active-standby configuration, first network device 106 may act as the active device that may be used to route traffic to both upstream and downstream devices. In an active-standby configuration, if the first network device 106 fails, the second network device 108 may take over the role and functionality of the first network device 106 from a management or control plane perspective. In an example, the first network device 106 may be a designated secondary network device and the second network device may be a designated primary network device in the MAC-LAG. In an active-active configuration, both the first network device 106 and the second network device 108 may be used to route traffic to both upstream and downstream devices.

In an example, first network device 106 and second network device 108 may provide redundant network connectivity to core network device 104 and/or access network device 110 via multi-chassis link aggregation group (MC-LAG) links. This may be referred to as multi-homing, which may be defined as the practice of connecting a host or a computer network to more than one network. This may be done, for example, to increase reliability or performance. In the present example, core network device 104 and/or access network device 110 may be provided redundant connectivity to a network through first network device 106 and second network device 108.

First network device 106 and second network device 108 may provide a multi-chassis LAG 112 for multi-chassis LAG links 112A and 112B to core network device 104. In an example, core network device 104, first network device 106, and second network device 108 may each run Link Aggregation Control Protocol (LACP) to bundle interfaces associated with multi-chassis LAG links 112A and 112B. The bundle may be treated as a single logical interface for network traffic forwarding.

First network device 106 and second network device 108 may provide a multi-chassis LAG 114 for multi-chassis LAG links 114A and 114B to access network device 110. In an example, access network device 110, first network device 106, and second network device 108 may each run Link Aggregation Control Protocol (LACP) to bundle interfaces associated with multi-chassis LAG links 114A and 114B. The bundle may be treated as a single logical interface for network traffic forwarding.

In an example, a dedicated communication link may be established between the first network device 106 and the second network device 108, for the first network device 106 and the second network device 108 to share network packets. A recipient network device (e.g., first network device 106 or second network device 108) may share packets received by it with the other network device (e.g., first or second network device 108, as the case may be). In an example, the packets may be transferred through a dedicated virtual LAN (VLAN) on Inter-Switch Link (ISL). In an example, first network device 106, and second network device 108 may each run Inter-Switch Link (ISL) protocol to establish inter-chassis communication. ISL protocol may be use to maintain VLAN information in Ethernet frames as traffic flows between first network device 106 and second network device 108. First network device 106 and second network device 108 may communicate network packets received from multi-chassis LAG to each other on ISL.

In an example, first network device 106 and/or second network device 108 may include a download engine 120, a performance engine 122, and an update engine 124.

Engines 120, 122, and 124 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of first network device 106 or second network device 108. In some examples, the at least one machine-readable storage medium may store instructions that, when executed by the at least one processing resource, at least partially implement some or all engines of first network device 106 or second network device 108. In such examples, first network device 106 or second network device 108 may include the at least one machine-readable storage medium storing the instructions and the at least one processing resource to execute the instructions.

In an example, download engine 120 may be used to download a software update onto first network device and second network device. In an example, a user interface such as a Command Line Interface (CLI) or a Graphical User Interface (GUI) may be used to provide a user input to download engine 120 of first network device 106 to initiate downloading of a software update onto first network device 106 and second network device 108.

In response to downloading of a software update onto first network device and second network device, performance engine 122 may perform a graceful shutdown of routing protocols on the first network device. Some non-limiting examples of the control plane protocols may include Link Aggregation Control Protocol (LACP), Open Shortest Path First (OSPF), Border Gateway Protocol (BGP), and Virtual Router Redundancy Protocol (VRRP). Each routing protocol may have its own process or command for shutting down gracefully. The graceful shutdown feature provides the ability to temporarily shut down a routing protocol in the least disruptive manner. The feature enables a routing protocol to notify its neighbors that it will not be available. A graceful shutdown of a routing protocol reduces or eliminates the loss of traffic along a link being shut down for maintenance. Network traffic that has another path through the network may be directed through the alternate path. For example, OSPF routing can be gracefully shut down on switches without losing packets that are in transit. OSPF neighbors are informed that the router should not be used for forwarding traffic, which allows for maintenance on the switch without interrupting traffic in the network. There is no effect on the saved switch configuration. Prior to a switch shutdown, the CLI boot command may be executed to initiate the sending of OSPF "empty hello list" messages on the interfaces that are part of the OSPF routing configuration. After a small delay (approximately 2 seconds) that allows the messages to be transmitted on all applicable interfaces, the boot or reload command continues.

During the graceful shutdown, each of the routing protocols configured on the first network device may advertise a maximum metric. A routing protocol on a router may advertise a maximum metric so that other routers do not prefer the router as an intermediate hop or a transit router. A routing protocol may set up a maximum metric for its interface(s) on the first network device. Setting up a maximum metric for an interface includes setting up the transit link cost of sending a packet through the interface to its maximum. This makes the path via this link costly thus shifting the traffic away from the first network device. For example, in case of OSPF, the protocol may advertise a maximum metric so that other routers do not prefer the router as an intermediate hop in their shortest path first (SPF) calculations. In case of OSPF, the max-metric router-lsa command may be used to enable the advertisement of a maximum metric. To disable the advertisement of a maximum metric, the no form of this command may be used. In a like manner, each of the routing protocols on first network device may have its own process or command to advertise a maximum metric so that other routers do not prefer the first network device as an intermediate hop. In an example, routing protocols running on first network device may be notified via internal messaging to begin shutting down gracefully.

In an example, the advertisement of maximum metric by the respective routing protocols on first network device may lead to a recalculation of network routes by a peer network device, for example, core network device and access network device. The upstream LACP LAG interface of first network device may be disabled, and Bridge Protocol Data Units (BPDUs) may be used to inform a peer device (for example, access network device and core network device). Bridge Protocol Data Units (BPDUs) are frames that contain information about the Spanning Tree Protocol (STP). For STP algorithms to function, the switches are expected to share information about themselves and their connections. They use BPDUs for this function. If any changes occur in the layer 2 network, such as when a link goes down, a new link is added, a new switch is added, or a switch fails, the switches share this information by transmitting BPDUs, causing the STP algorithm to be re-executed, and a new loop-free topology is then created.

In response to receiving the BPDUs, a peer network device, for example, access network device may mark its connected LAG link as LACP-block and send all upstream traffic to second network device through its other leg of LAG. Thus, all South to North traffic (i.e. traffic heading into the network) may be deflected to secondary network device and upstream traffic loss is avoided when first network device reboots during a software update. Likewise, core network device may mark its connected LAG link as LACP-block and send all downstream traffic to second network device through its other leg of LAG. Thus, all North to South traffic (i.e. traffic heading out of the network) may be deflected to secondary network device and upstream traffic loss is avoided when first network device reboots during a software update.

Once graceful shutdown of routing protocols on first network device is complete, update engine 124 may apply the software update to the first network device. The application of software update may result in the rebooting of first network device. During his period, network traffic on the network may be routed through the second network device until the software update on the first network device is complete.

Once the software update on the first network device is complete, first network device may sync, for example, Media Access Control address (MAC address), Address Resolution Protocol (ARP), and Spanning Tree Protocol (STP) information or databases from second network device to resume operation. For example, a route learned through OSPF may be synchronized between the first network device 106 and the second network device 108, for example, via a forwarding information base (FIB)-sync over the communication link between them.

After first network device resumes operation, a graceful shutdown of routing protocols may occur on the second network device. The process for the graceful shutdown of routing protocols on the second network device may be similar to as described herein in this document for the first network device.

Once graceful shutdown of routing protocols on second network device is complete, update engine 124 may apply the software update to the second network device. The application of software update may result in the rebooting of second network device. During this period, network traffic on the network may be routed through the first network device until the software update on the second network device is complete.

In an example, in response to downloading of a software update onto first network device and second network device, performance engine on second network device may perform a graceful shutdown of routing protocols on the second network device. During the graceful shutdown, each of the routing protocols configured on the second network device may advertise a maximum metric. In an example, routing protocols running on second network device may be notified via internal messaging to begin shutting down gracefully.

In an example, the advertisement of maximum metric by the respective routing protocols on second network device may lead to a recalculation of network routes by a peer network device, for example, core network device and access network device.

In response to receiving the BPDUs, a peer network device, for example, access network device may mark its connected LAG link as LACP-block and send all upstream traffic to first network device through its other leg of LAG. Thus, all South to North traffic may be deflected to first network device and upstream traffic loss is avoided when second network device reboots during a software update. Likewise, core network device may mark its connected LAG link as LACP-block and send all downstream traffic to first network device through its other leg of LAG. Thus, all North to South traffic may be deflected to first network device and upstream traffic loss is avoided when second network device reboots during a software update.

Once graceful shutdown of routing protocols on second network device is complete, update engine 124 may apply the software update to the second network device. The application of software update may result in the rebooting of second network device. During this period, network traffic on the network may be routed through the first network device until the software update on the second network device is complete.

Once the software update on the second network device is complete, second network device may sync, for example, MAC address, ARP, and STP information or databases from first network device to resume operation. After second network device resumes operation, a graceful shutdown of routing protocols may occur on the first network device. The process for the graceful shutdown of routing protocols on the first network device may be similar to as described herein in this document for the second network device.

Once graceful shutdown of routing protocols on first network device is complete, update engine may apply the software update to the first network device. The application of software update may result in the rebooting of first network device. During this period, network traffic on the network may be routed through the second network device until the software update on the second network device is complete.

Figure 2:
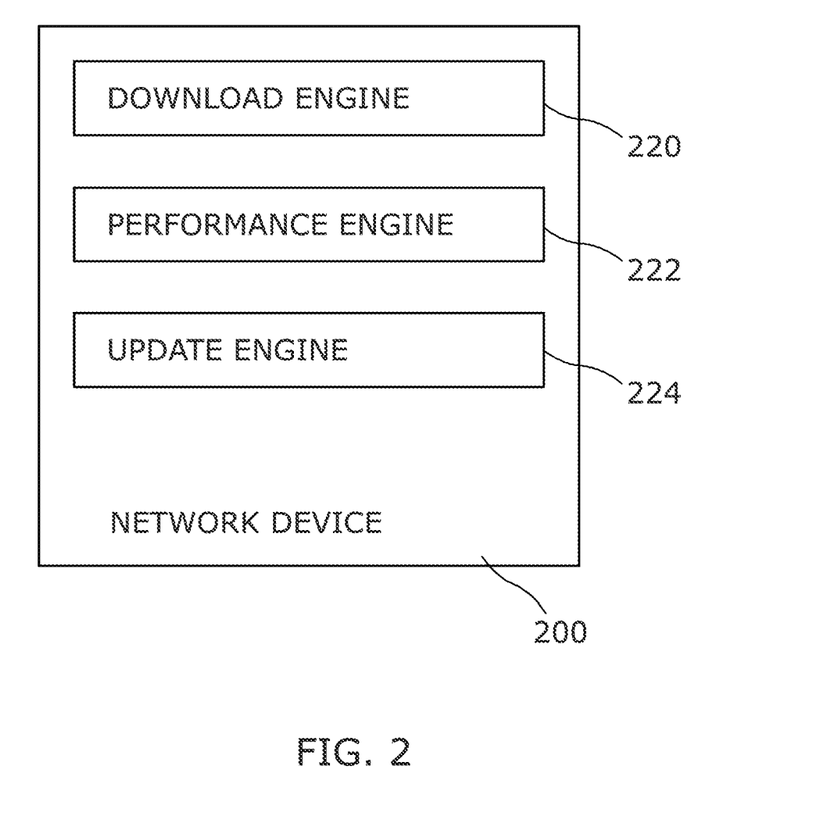
FIG. 2 is a block diagram of an example MAC-LAG network device for performing a software update.

FIG. 2 is a block diagram of an example MC-LAG network device 200 for performing a software update.

In an example, network device 200 may be analogous to first network device 106 or second network device 108 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

Network device 200 may include, for instance, a network router, a virtual router, a network switch, or a L3 network device with L2 functionality.

In the example of FIG. 2, network device 200 may include a download engine 220, a performance engine 222, and an update engine 224. In an example, download engine 220, performance engine 222, and update engine 224 may perform functionalities as described in respect of download engine 120, performance engine 122, and update engine 124 of FIG. 1, respectively.

In an example, download engine 220 may download a software update onto the network device 200 and a peer network device (not illustrated). The network device and the peer network device may form a multi-chassis link aggregation group (MC-LAG) that provides a redundant connectivity to a network switch in a network. In an example, the network switch may be a core network switch. In another example, the network switch may be an access network switch. Performance engine 222 may perform a graceful shutdown of routing protocols on the network device. Each of the routing protocols may advertise a maximum metric on the network device. This may lead to a recalculation of network routes by the network switch. Update engine 224 may update the network device with the software update. Until the software update on the network device is complete, network traffic on the network may be routed through the peer network device.

Figure 3:
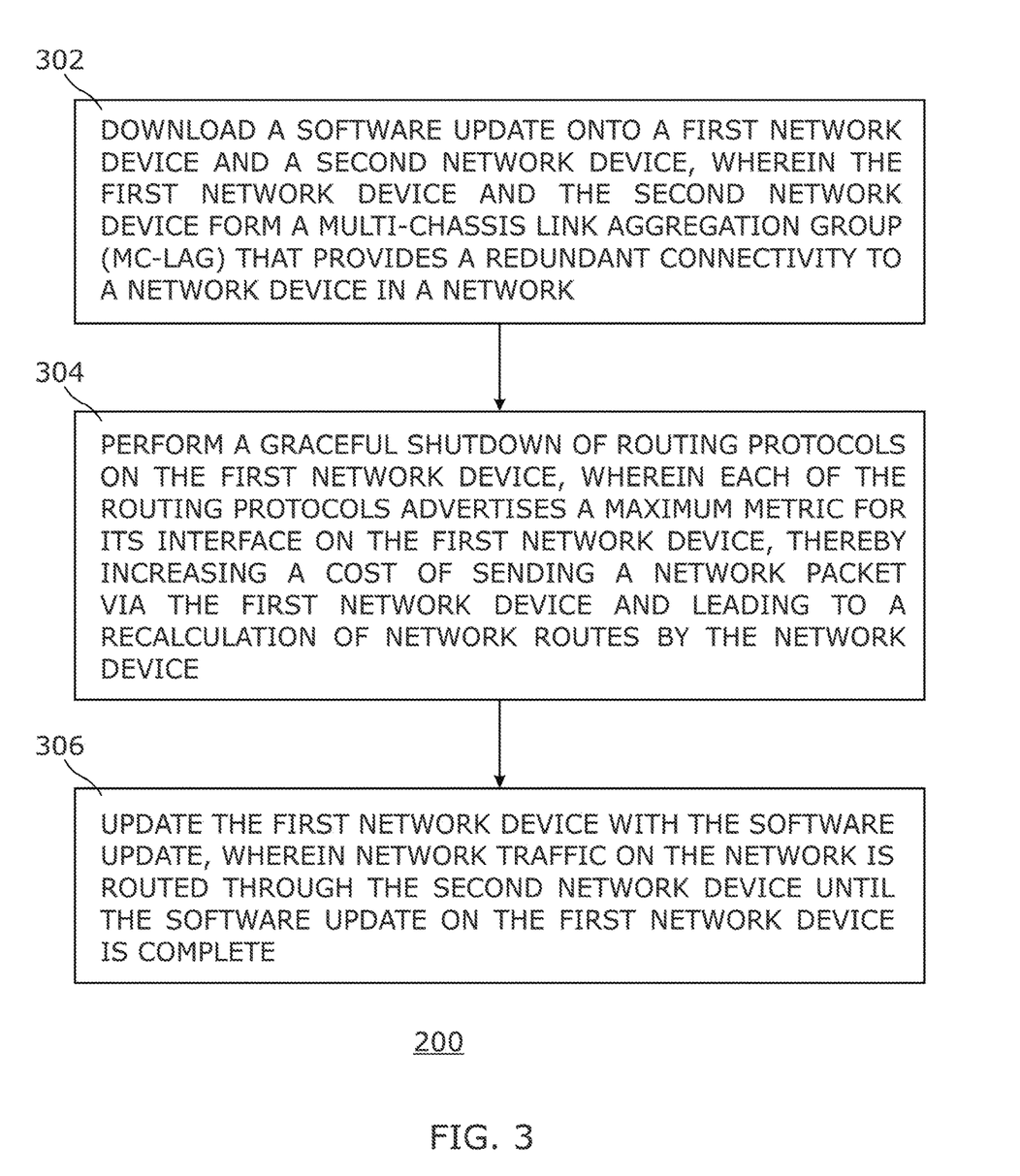
FIG. 3 is a block diagram of an example method of performing a software update on a network device forming a MC-LAG.

FIG. 3 is a block diagram of an example method 300 of performing a software update on a network device forming a MC-LAG. The method 300, which is described below, may be partially executed on a network device such as first network device 106 or second network device 108 of FIG. 1. However, other suitable network devices may execute method 300 as well. At block 302, a software update onto a first network device and a second network device may be downloaded. The first network device and the second network device may form a multi-chassis link aggregation group (MC-LAG) that provides a redundant connectivity to a network device in a network. In an example, the first network device and the second network device appear as one virtual switch to the network device when forming the MC-LAG. In an example, the first network device and the second network device may each be an aggregation network switch. In an example, the network device may be an upstream device in the network. In an example, the network device may be a downstream device in the network. At block 304, a graceful shutdown of routing protocols on the first network device may be performed. Each of the routing protocols may advertise a maximum metric on the first network device, leading to a recalculation of network routes by the network device. At block 306, the first network device may be updated with the software update, wherein network traffic on the network may be routed through the second network device until the software update on the first network device is complete.

Figure 4:
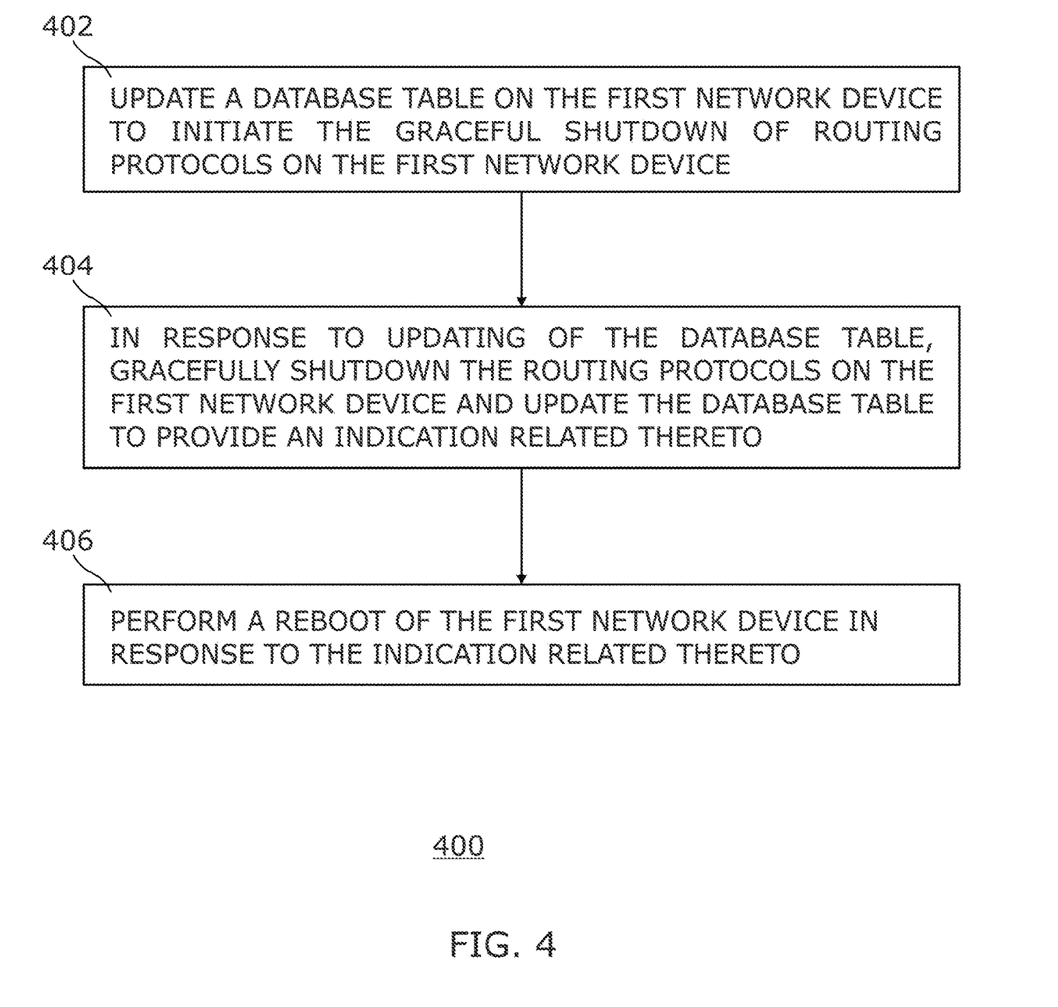
FIG. 4 is a block diagram of an example method of performing a software update on a network device forming a MC-LAG.

In an example, illustrated by FIG. 4, performing a graceful shutdown of routing protocols on first network device may comprise updating, by performance engine 122, a column (for example, "graceful_shutdown_initiate") in a database table on the first network device to indicate that the graceful shutdown of routing protocols is to be initiated (block 402). The routing protocols on first network device may listen on the aforesaid column, perform a respective graceful shutdown, and update a respective column in the database table with an indication (for example, 'shutdown_done') that a graceful shutdown is complete (block 404). Each of the routing protocols may provide an indication related thereto. In response to said indication, update engine 124, which may be listening to the respective columns of the routing protocols in the database table may proceed to apply the software update to the first network device (block 406), which may include a reboot of the first network device. Once the software update on the first network device is complete, first network device may sync, for example, MAC address, ARP, and STP information from second network device to resume operation. After first network device resumes operation, a graceful shutdown of routing protocols may occur on the second network device utilizing a database table on the second network device as described in an aforementioned manner.

Figure 5:
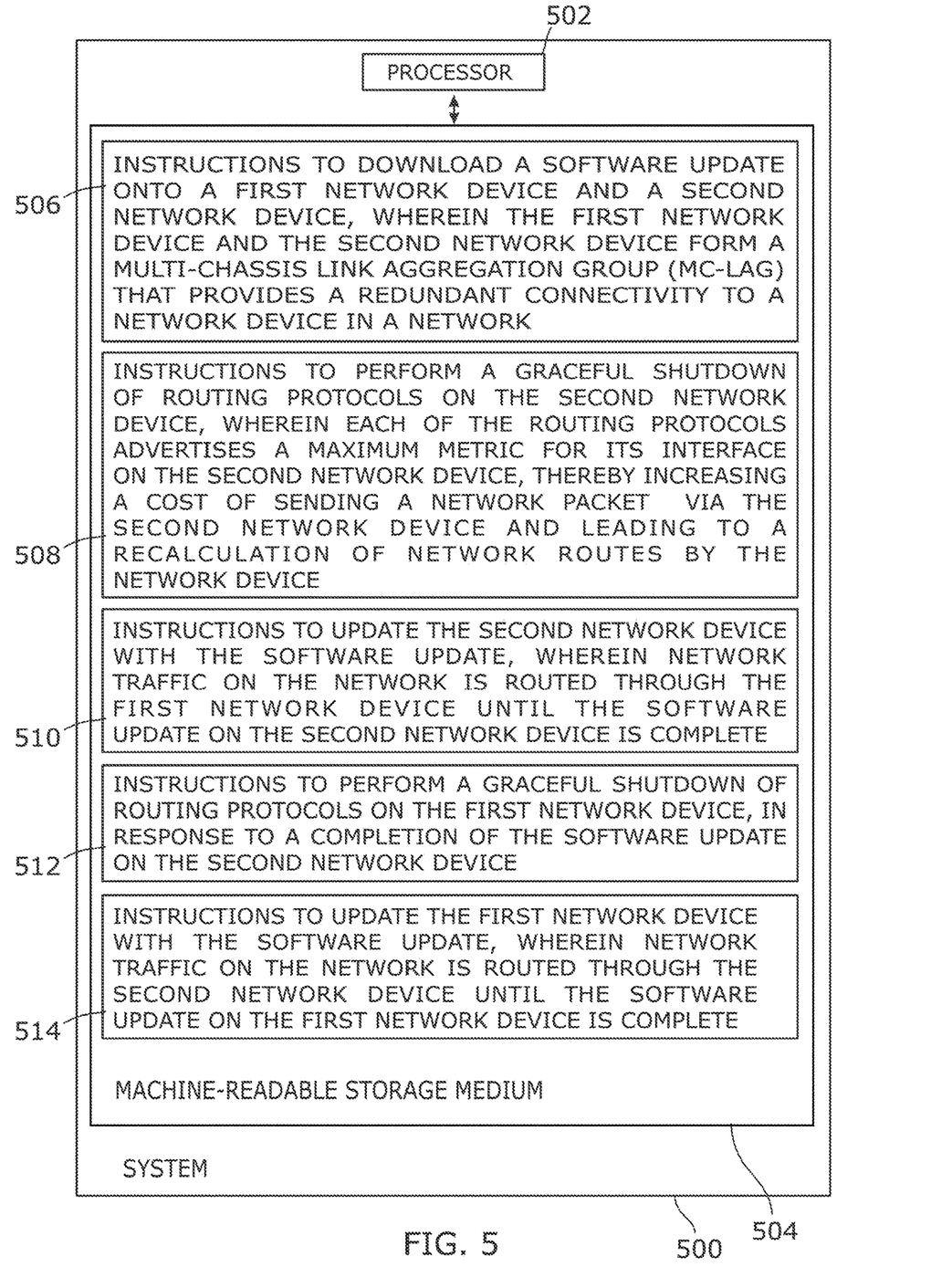
FIG. 5 is a block diagram of an example system including instructions in a machine-readable storage medium for performing a software update on a network device forming a MC-LAG.

FIG. 5 is a block diagram of an example system 500 including instructions in a machine-readable storage medium for performing a software update on a network device forming a MC-LAG. System 500 includes a processor 502 and a machine-readable storage medium 504 communicatively coupled through a system bus. In an example, system 500 may be analogous to first network device 106, second network device 108 of FIG. 1, or network device 200 of FIG. 2. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506, 508, 510, 512, and 514. In an example, instructions 506 may be executed by processor 502 to download a software update onto a first network device and a second network device, wherein the first network device and the second network device form a multi-chassis link aggregation group (MC-LAG) that provides a redundant connectivity to a network device in a network.

Instructions 508 may be executed by processor 502 to perform a graceful shutdown of routing protocols on the second network device, wherein each of the routing protocols advertises a maximum metric on the second network device, leading to a recalculation of network routes by the network device.

Instructions 510 may be executed by processor 502 to update the second network device with the software update, wherein network traffic on the network is routed through the first network device until the software update on the second network device is complete.

Instructions 512 may be executed by processor 502 to in response to a completion of the software update on the second network device, perform a graceful shutdown of routing protocols on the first network device.

Instructions 514 may be executed by processor 502 to update the first network device with the software update, wherein network traffic on the network is routed through the second network device until the software update on the first network device is complete.

For the purpose of simplicity of explanation, the example methods of FIGS. 3 and 4 are shown as executing serially, however it is to be understood and appreciated that the present and other examples are not limited by the illustrated order. The example systems of FIGS. 1, 2, and 5, and methods of FIGS. 3 and 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method, comprising:
    downloading a software update onto a first network device and a second network device, wherein the first network device and the second network device form a multi-chassis link aggregation group (MC-LAG) that provides a redundant connectivity to a third network device in a network;
    performing a graceful shutdown of routing protocols on the first network device, wherein each of the routing protocols advertises a maximum metric for an interface of the routing protocol on the first network device, thereby increasing a cost of sending a network packet via the first network device and leading to a recalculation of network routes by the third network device;
    updating the first network device with the software update, wherein network traffic on the network is routed through the second network device until the software update on the first network device is complete;
    in response to a completion of the software update on the first network device, performing a graceful shutdown of routing protocols on the second network device; and
    updating the second network device with the software update, wherein network traffic on the network is routed through the first network device until the software update on the second network device is complete.

2. The method of claim 1, wherein the maximum metric sets an interface cost of a routing protocol on the first network device to a maximum of the interface cost of the routing protocol on the first network device.

3. The method of claim 1, wherein performing comprises:
    updating a database table on the first network device to indicate that a graceful shutdown of the routing protocols on the first network device is to be initiated; and
    in response to updating of the database table on the first network device, performing the graceful shutdown of the routing protocols on the first network device and updating the database table on the first network device to indicate that the graceful shutdown of the routing protocols on the first network device is complete.

4. The method of claim 3, wherein updating the first network device with the software update comprises performing a reboot of the first network device in response to updating of the database table on the first network device to indicate that the graceful shutdown of the routing protocols on the first network device is complete.

5. The method of claim 1, wherein the first network device is a designated secondary network device in the MC-LAG.

6. The method of claim 1, wherein the second network device is a designated primary network device in the MC-LAG.

7. The method of claim 1, further comprising a dedicated communication link between the first network device and the second network device, for the first network device and the second network device to share network packets.

8. A network device, comprising:
    a download engine to download a software update onto the network device and a peer network device, wherein the network device and the peer network device form a multi-chassis link aggregation group (MC-LAG) that provides a redundant connectivity to a network switch in a network;
    a first performance engine to perform a graceful shutdown of routing protocols on the network device, wherein each of the routing protocols advertises a maximum metric for an interface of the routing protocol on the network device, thereby increasing a cost of sending a network packet via the network device and leading to a recalculation of network routes by the network switch; and
    a first update engine to update the network device with the software update, wherein network traffic on the network is routed through the peer network device until the software update on the network device is complete, wherein the peer network device comprises:
    a second performance engine to, in response to a completion of the software update on the network device, perform a graceful shutdown of routing protocols on the peer network device, wherein each of the routing protocols advertises a maximum metric for an interface of the routing protocol on the peer network device, thereby increasing a cost of sending a network packet via the peer network device and leading to a recalculation of network routes by the network switch; and
    a second update engine to update the peer network device with the software update, wherein network traffic on the network is routed through the network device until the software update on the peer network device is complete.

9. The network device of claim 8, wherein the network switch is a core network switch.

10. The network device of claim 8, wherein the network switch is an access network switch.

11. The network device of claim 8, wherein the first performance engine is further to:
   update a database table on the network device to indicate that a graceful shutdown of the routing protocols on the network device is to be initiated; and
   in response to updating of the database table on the network device, perform the graceful shutdown of the routing protocols on the network device and update the database table on the network device to indicate that the graceful shutdown of the routing protocols on the network device is complete.

12. A non-transitory machine-readable storage medium storing instructions, the instructions executable by a processor to:
   download a software update onto a first network device and a second network device, wherein the first network device and the second network device form a multi-chassis link aggregation group (MC-LAG) that provides a redundant connectivity to a third network device in a network;
   perform a graceful shutdown of routing protocols on the second network device, wherein each of the routing protocols advertises a maximum metric for an interface of the routing protocol on the second network device, thereby increasing a cost of sending a network packet via the second network device and leading to a recalculation of network routes by the third network device;
   update the second network device with the software update, wherein network traffic on the network is routed through the first network device until the software update on the second network device is complete;
   in response to a completion of the software update on the second network device, perform a graceful shutdown of routing protocols on the first network device; and
   update the first network device with the software update, wherein network traffic on the network is routed through the second network device until the software update on the first network device is complete.

13. The non-transitory machine-readable storage medium of claim 12, wherein the first network device and the second network device appear as one virtual switch to the third network device when forming the MC-LAG.

14. The non-transitory machine-readable storage medium of claim 12, wherein the first network device and the second network device are an aggregation network switch.

15. The non-transitory machine-readable storage medium of claim 12, wherein the first network device and the second network device synchronize databases of the first network device and the second network device over an Inter-Switch Link (ISL).

16. The non-transitory machine-readable storage medium of claim 15, wherein the databases of the first network device and the second network device include at least one of a Media Access Control address (MAC address) database, an Address Resolution Protocol (ARP) database, and a Spanning Tree Protocol (STP) database.

17. The non-transitory machine-readable storage medium of claim 12, wherein the third network device includes an upstream device in the network.

18. The non-transitory machine-readable storage medium of claim 12, wherein the third network device includes a downstream device in the network.

19. The non-transitory machine-readable storage medium of claim 12, wherein the instructions to perform the graceful shutdown of the routing protocols on the second network device further comprise instructions executable by the processor to:
   update a database table on the second network device to indicate that a graceful shutdown of the routing protocols on the second network device is to be initiated; and
   in response to updating of the database table on the second network device, perform the graceful shutdown of the routing protocols on the second network device and update the database table on the second network device to indicate that the graceful shutdown of the routing protocols on the second network device is complete.

20. The non-transitory machine-readable storage medium of claim 12, wherein the maximum metric sets an interface cost of a routing protocol on the second network device to a maximum of the interface cost of the routing protocol on the second network device.

* * * * *